April 20, 1965  O. B. CRUSE  3,179,019
FRICTION DEVICE OPERATING MECHANISM
Filed Oct. 12, 1962  2 Sheets-Sheet 1

INVENTOR
OLIVER B. CRUSE
BY
*Joseph E. Papin*

INVENTOR
OLIVER B. CRUSE ically relates to friction device operating mechanisms and in particular to a friction device operating mechanism having emergency actuating means therein.

An object of the present invention is to provide a self-contained friction device operating mechanism for a vehicle pressure fluid system having resiliently urged emergency means with service actuating means reciprocally mounted therein, said resiliently urged emergency means and service actuating means being concertly movable for friction device energizing purposes under emergency conditions when the fluid pressure supplied from said system to said resiliently urged emergency means is less than a predetermined amount and being relatively movable in response to fluid pressure metered thereto from said system for fluid pressure friction device energizing purposes.

Another object of the present invention is to provide a friction device operating mechanism having means therein for limiting the friction device energizing force thereof.

Another object of the present invention is to provide a friction device operating mechanism having resiliently urged means therein for mechanically energizing a friction device and disabling means operatively connected with said resiliently urged means to de-energize said friction device.

These and other objects and advantages will become apparent hereinafter.

Briefly, the invention embodies resiliently urged emergency means for energizing a friction device when fluid pressure applied thereto from the source of fluid pressure is less than a predetermined amount and service means reciprocally mounted in said emergency means for energizing said friction device in response to fluid pressure metered therethrough from said source. The emergency means also embodies disabling means for overcoming the emergency function of the resiliently urged means when the fluid pressure of the source is less than the predetermined amount.

Figure 2:
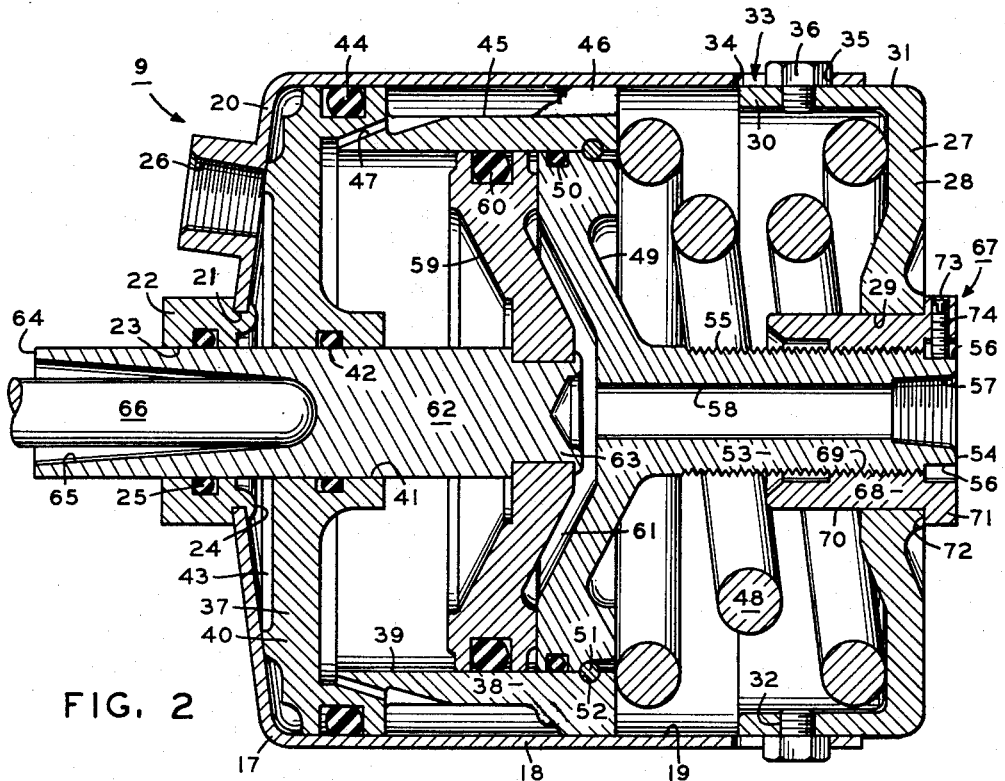
Figure 1:
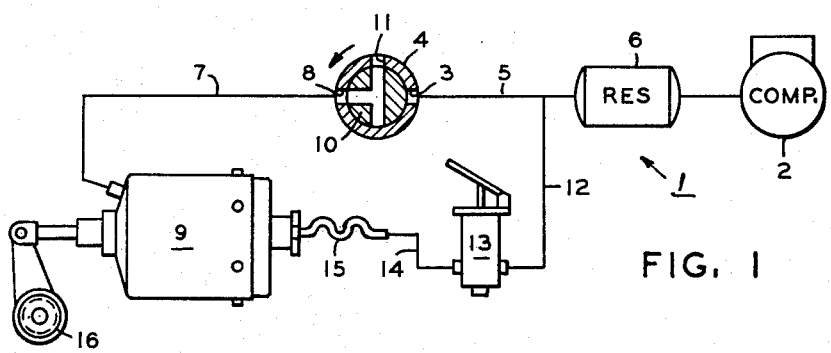
Figure 3:
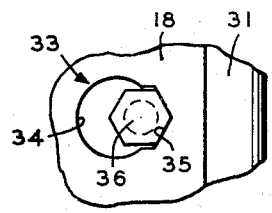
Figure 5:
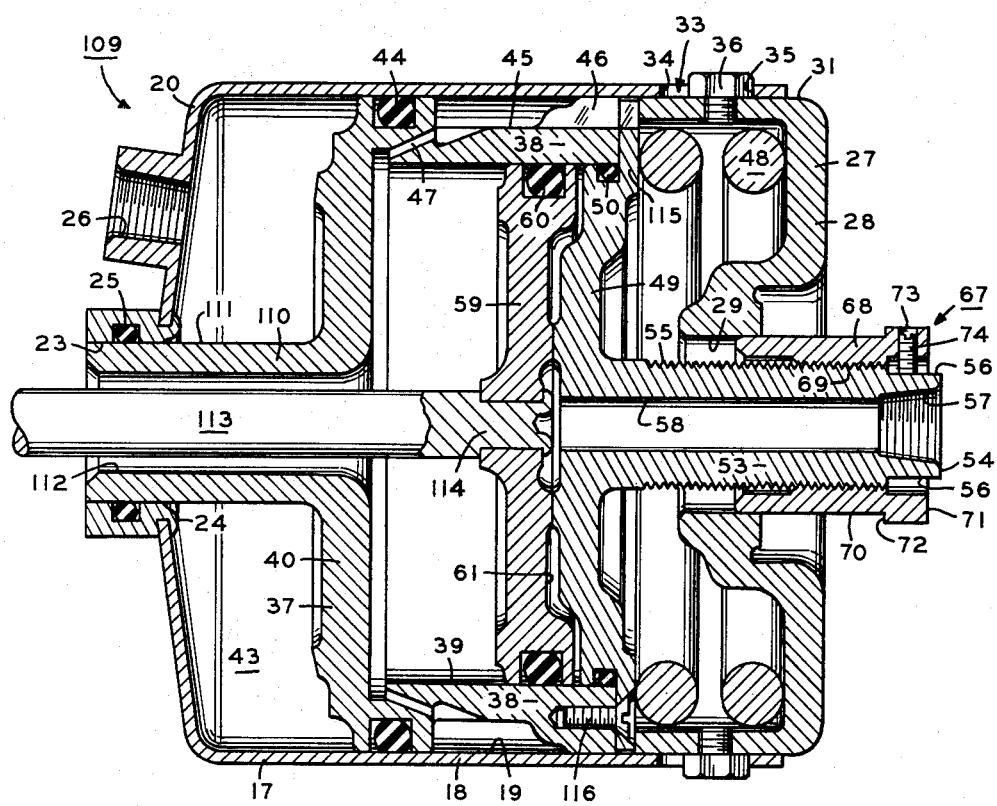
Figure 4:
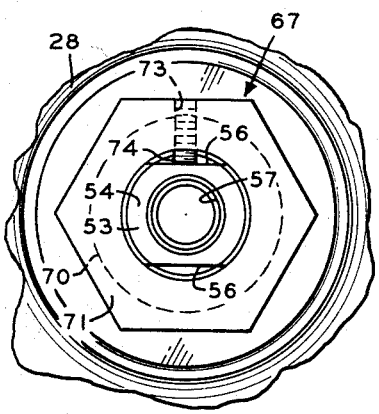

The invention also consists in the parts and arrangement of parts hereinafter described and claimed. In the accompanying drawings which form a part of the specification and wherein like numerals refer to like parts wherever they occur:

FIG. 1 is a diagrammatic view of an actuating system showing a friction device operating mechanism embodying the present invention therein, FIG. 2 is a greatly enlarged cross-sectional view of the friction device operating mechanism in FIG. 1, FIG. 3 is a fragmentary view of the friction device operating mechanism in FIG. 2 showing the housing retaining means employed therein, FIG. 4 is a fragmentary right-side view of the friction device operating mechanism shown in FIG. 2, and FIG. 5 is a cross-sectional view of another friction device operating mechanism embodying the present invention.

Referring now to FIG. 1 in detail, a friction device actuating system, indicated generally at 1, is provided with pressure generating means, such as compressor 2, which is connected to the inlet 3 of a charging or control valve 4 by a conduit 5. A fluid pressure storage reservoir 6 is interposed in the conduit 5 forming, in combination with the compressor 2, a source of fluid pressure, and another conduit 7 is interposed between an outlet 8 of the charging valve 4 and an emergency port of a friction device operating mechanism or actuating cylinder 9. The charging valve 4 is provided with rotatable passage means 10 connecting the outlet 8 in pressure fluid communication with an exhaust port 11 to vent said outlet to atmosphere; however, said passage means can be rotated counterclockwise (in the direction of the arrow) to a position in said charging valve establishing communication between said outlet and the inlet 3. A conduit 12 has one end intersecting with the conduit 5 and the other end thereof connecting to the inlet side of an application valve 13, and another conduit or service line 14 having a movable or resilient portion 15 is interposed between a service or outlet side of said application valve and the service port of the actuating cylinder 9. To complete the system 1, the push rod of the actuating cylinder 9 is pivotally connected with linkage means or actuating lever, such as slack adjuster 16, for energizing a friction device (not shown).

The actuating cylinder 9, FIG. 2, is provided with a housing or cylinder 17 having an annular side wall 18 with a bore 19 therein, and an end wall 20 is integrally formed with said side wall 18 closing one end of the housing bore 19. The end wall 20 is provided with a centrally located aperture 21, and an annular member 22 having an axial bore 23 therethrough is fixedly positioned in the end wall aperture 21 by suitable means, such as staking, at 24. An O-ring seal 25 is carried in the annular member bore 23, and an emergency port 26 which receives the conduit 7, as previously mentioned, is provided in the housing 17 extending through the end wall 20 into open pressure fluid communication with the housing bore 19. A closure member 27 is provided with a radially extending wall 28 defining an axial opening 29 in the central portion thereof, and said wall 28 is integrally connected with an annular peripheral flange 30. The closure member flange 30 is provided with a peripheral surface 31 which is slidably received in the rightward end of the housing bore 19, and a plurality of threaded cross passages 32 are provided in said closure member flange in predetermined alignment with a plurality of openings 33 provided through the housing side wall 18 adjacent the rightward end thereof.

As shown in FIGS. 2 and 3, the openings 33 include a substantially circular aperture 34 which is intersected on one side thereof by a stud head receiving portion 35, and studs 36 are threadedly received in the threaded cross passages 32 of the closure member 27 with the head portions thereof fixedly positioned in the stud head receiving portion 35 of the openings 33. The engagement between the head portions of the studs 36 and the stud receiving portion 35 of the openings 33 normally prevent undesired rotation of said studs to obviate displacement thereof from the closure member cross passages 32.

A power or emergency piston 37 is provided with a sleeve portion 38 having a sleeve bore 39 therein. One end of the sleeve bore 39 is closed by a radially extending head portion or end wall 40 which is integrally connected with said sleeve portion adjacent the leftward end thereof. The end wall 40 is provided with an axial bore 41 therethrough in alignment with the annular member bore 23, and an O-ring seal 42 is carried in the end wall bore 41. An expansible emergency chamber 43 is formed in the housing bore 19 between the piston head 40 and housing end wall 20 in open pressure fluid communication with the emergency port 26. Another O-ring seal 44 is carried in the emergency piston 37 adjacent the leftward end of the sleeve portion 38 in sealing engagement with the housing bore 19, and a peripheral recess 45 is provided in said sleeve portion between the O-ring seal 44 and a plurality of spaced guide flanges 46 integrally connected with said sleeve portion adjacent the rightward end thereof. A plurality of venting passages 47 are provided in the sleeve portion 38 having one end intersecting with the leftward end of the sleeve bore 39 and the other end thereof connecting with the peripheral recess 45. An emergency spring 48 is interposed between the closure member end wall 28 and the rightward end of the piston sleeve 38 normally urging the emergency piston 37 in a working direction toward an operative position to engage the piston head 40 with the housing end wall 20.

A base wall or bore closure member 49 is slidably received in the sleeve bore 39, and an O-ring seal 50 is carried in the peripheral portion thereof in sealing engagement with said sleeve bore. The base wall member 49 is normally engaged with a split snap ring or retainer member 51 positioned in a cooperating groove 52 adjacent the rightward end of the sleeve bore 39 and is thereby retained against displacement from said sleeve bore. A cylindrical extension 53 is integrally provided on the base wall member 49 and extends coaxially through the opening 29 in the closure member 27 having a free end 54 exteriorly thereof. The extension 53 is provided with a threaded peripheral surface 55, and a plurality of flats 56 are provided adjacent to the free end 54. A service port 57 which receives the conduit 15, as previously mentioned, is provided in the free end 54, and an axial passage 58 which extends through the extension 53 and base wall member 49 has one end connecting with said service port and the other end thereof in open pressure fluid communication with the sleeve bore 39.

A service piston or actuator 59 is slidably received in the sleeve bore 39, and an O-ring seal 60 is carried in the peripheral portion thereof in sealing engagement with said sleeve bore. An expansible service chamber 61 is provided in the sleeve bore 39 between the service piston 59 and base wall member 49 in open pressure fluid communication with the passage 58 and service port 57. The service piston 59 is provided with an extension or push rod 62 which is connected thereto by suitable means, such as staking at 63, and said extension is slidably received in the piston head bore 41 and annular member bore 23 having a working end 64 exteriorly of the housing 17. An axial recess 65 is provided in the working end 64 to pivotally receive a push rod 66 which is operatively connected to the slack adjuster 16, as previously mentioned. The service piston 59 is normally engaged with the base wall member 49 by the force of the resilient means of the friction device (not shown) which is a well-known expediency in the art; however, if desired, a separate return spring (not shown) could be interposed between the piston head 40 and said service piston.

To complete the actuating cylinder 9, disabling or emergency release means, indicated generally at 67, are provided to mechanically effect retractile movement of the emergency piston 37 in a non-working direction against the compressive force of the spring 48, as described hereinafter. Disabling means 67 is provided with a cylindrical body 68 having an axial threaded bore 69 therethrough, a peripheral surface 70, and a hexagonally-shaped flange 71 integrally formed adjacent the rightward end thereof. The threaded bore 69 is cooperatively received on the threaded peripheral surface 55 of the base wall extension 53, and the peripheral surface 70 of the body 68 is slidably and guidingly received in the closure member opening 29. The flange 71 is provided with a bearing surface 72 for bearing engagement with the closure member end wall 28 about the opening 29, and a threaded cross-passage 73 is provided in said flange intersecting with the bore 69. A set screw 74 is threadedly received in the cross-passage 73 and normally has one end in abutting engagement with the flat 56 on the free end 54 of the base wall extension 53 to prevent relative rotation of the body 68 and said base wall extension.

In the operation with the component parts of the system 1 and actuating cylinder 9 positioned as above described and as shown in FIGS. 1 and 2, the friction device (not shown) is mechanically energized. Assuming that normal operating conditions exist wherein the storage reservoir 6 is charged with fluid pressure above a predetermined amount from the compressor 2, rotation of the charging valve in a counterclockwise direction (as shown by the arrow in FIG. 1) connects said reservoir in fluid pressure communication with the emergency chamber 43 through the emeregncy port 26, the conduit 7, the outlet 8, passage means 10 and inlet 3 of the control valve 4, and the conduit 5. Fluid pressure so transmitted to the emergency chamber 43 acts on the effective area of the emergency piston head 40 creating an emergency force to retractively urge the emergency piston 37 in a non-working direction toward an inoperative position and into engagement with the closure member flange 30 against the compressive force of the emergency spring 48. As previously mentioned, the compressive forces of the friction device components normally maintain the service piston 59 in engagement with the emergency piston base wall 49 so that said service piston is concurrently movable with said emergency piston 37 to de-energize the friction device.

If the operator desires to initiate a normal service application to energize the friction device and effect deceleration or a complete stop, a manual force applied on the application valve 13 meters fluid pressure from the reservoir 6 through conduits 5 and 12, said application valve, the service line 14 and 15, and the service port 57 and passage 58 into the service chamber 61. The fluid pressure so established in the service chamber 61 acts on the effective area of the service piston 59 creating a service force to move said service piston 59 and extension 62 leftwardly to actuate the working end 64 of said extension, the push rod 66 and slack adjuster 16 and energize the friction device. When the applied force is removed from the application valve 13, the fluid pressure is exhausted to atmosphere from the service chamber 61 through the passage 58 and service port 57, conduits 14 and 15, and the exhaust port of said application valve to eliminate the service force, and the spring forces of the friction device are utilized to move the slack adjuster 16, push rod 66, extension 62 and service piston 59 to their original inoperative positions.

In an emergency condition when the fluid pressure in the reservoir 6 is reduced below the predetermined amount due to leaks in the system 1 or a non-producing compressor 2, or the like, the fluid pressure in the emergency chamber 43 is correspondingly reduced thereby reducing the emergency force opposing the compressive force of the emergency spring 48. When the magnitude of the emergency spring force overcomes the reduced emergency force, the spring 48 is extendable to urge the emergency piston 37 leftwardly in a work-producing direction toward an operative position wherein the piston head 40 is moved toward abutting engagement with the housing end wall 20. Since the service piston 59 is abuttingly engaged with the end wall member 49, said service piston and the extension 62 are concertly moved leftwardly in a working direction toward their operative position to actuate the extension working end 64, push rod 66 and slack adjuster 16 and effect mechanical energization of the friction device. When the friction device is so mechanically energized, disabling means 67 are also concertly movable in a leftward direction with the emergency piston 37. While the friction device is mechanically energized under emergency conditions, the operator may also initiate a service application, as above described, if desired; however, the service force so established to actuate the service piston 59 is, in effect, absorbed or cancelled since the fluid pressure metered to the service chamber 61 also acts on the effective area of the end wall member 49 of the emergency piston 37 creating a substantially equal and opposite reaction force. The reaction force serves to move the emergency piston 37 rightwardly against the compressive force of the emergency spring 48 thereby preventing compounding of the emergency spring and service forces. In view of the above, it is obvious that the compression of the emergency spring 48 in response to rightward movement of the emergency piston 37 by the reaction force substantially absorbs or cancels the service force and limits the maximum friction device energizing force of the actuating cylinder 9 by preventing the compounding of the service and emergency spring forces, which compounding of forces might serve to bend or fracture some component parts of said actuating cylinder, linkage or friction device.

With the component parts of the system 1 and actuating cylinder 9 positioned as above described, the friction device is mechanically energized under emergency conditions to effect an emergency vehicle stop. Often such emergency vehicle stops occur at inopportune times and place the vehicle in a dangerous position with regard to other vehicles on the road; therefore, after such emergency stops occur, it is advantageous and desirable to move the vehicle to a less dangerous position to correct the failure in the system 1 and/or actuating cylinder 9 and subsequently re-establish normal operations. Emergency release means 67 are provided to positively contain the compressive force of the emergency spring 48 and retractively move the emergency piston 37 toward its inoperative position to de-energize the friction device under emergency conditions, as hereinafter described. The set screw 74 is manually moved out of engagement with the flat 56 on the base wall extension 53, and a force is manually applied on the force-transmitting flange 71 to rotate the body member 68. Initially the threaded engagement between the body member bore 69 and extension peripheral surface 55 effects leftward movement of the body member 68 in response to the applied force thereon to engage the bearing surface 72 of the flange 71 with the closure member end wall 28. With the bearing surface 72 in bearing engagement with the closure member end wall 28, further rotation of the body member 68 in response to the applied force effects further threaded engagement between the threaded bore 69 and the extension peripheral surface 55 to retractively move the emergency piston 37 against the compressive force of the emergency spring 48 toward the inoperative position thereof. In view of the above, it is apparent that the emergency spring 48 is now positively contained between the emergency piston 37 and the closure member wall 28 through the threaded engagement of the body member 68 and base wall extension 53 and the bearing engagement between the bearing surface 72 of the flange 71 and the closure member end wall 28. Upon retractile movement of the emergency piston 37 toward its inoperative position, the spring forces of the friction device are utilized to move the slack adjuster 16, push rod 66, service piston extension 62 and the service piston 59 in follow-up relation toward their inoperative positions wherein the friction device is now mechanically de-energized so that the vehicle can now be moved to a more advantageous and less dangerous position. Any fluid pressure which the system 1 may contain can be utilized to initiate a service application, as previously described, to effect energization of the friction device when the disabling means 67 are actuated to overcome the emergency function of the emergency spring 48; and in this manner, the vehicle can be controllably moved to a more advantageous and less dangerous position to correct the fluid pressure failure.

When the fluid pressure failure has been corrected and the fluid pressure in the reservoir 6 is increased to an amount greater than the predetermined amount wherein normal operating conditions are now re-established, the fluid pressure in the emergency chamber 43 of the actuating cylinder 9 is correspondingly increased to re-establish the magnitude of the emergency force. When the magnitude of the emergency force becomes greater than that of the compressive force of the spring 48, it is apparent that said emergency force will maintain the emergency piston 37 in its inoperative position against the spring force, and the body member 68 of the disabling means 67 may now be freely returned to its original position.

Of course, the operator may initiate the emergency function of the actuating cylinder 9, if he so desires, by "dynamiting" the system 1. To "dynamite" the system 1, the operator merely rotates the charging valve passage means 40 in a counterclockwise direction (as shown by the arrow in FIG. 1) to a position aligned between the outlet 8 and the exhaust port 11 of the charging valve 4 thereby venting the emergency chamber 43 to atmosphere. With the emergency chamber 43 vented to atmosphere, the emergency function of the actuating cylinder 9 is initiated, as described hereinbefore, to effect mechanical energization of the friction device.

Referring now to FIG. 5, another friction device operating mechanism or actuating cylinder 109 is shown having substantially the same component parts and functioning in the system 1 in substantially the same manner as the previously described actuating cylinder 9 with the following exceptions. The piston head 40 of the emergency piston 37 is provided with an integral cylindrical extension 110 having a peripheral surface 111 slidably received in the abutment member bore 23 in sealable engagement with the O-ring seal 25, and a bore 112 is axially provided through the cylindrical extension 110 and the piston head 40 in communication with the sleeve member bore 39. A push rod 113 extends coaxially through the bore 112 having one end connected with the service piston 59 by suitable means, such as staking at 114, and the other end operatively connected with the slack adjuster 16, as previously mentioned. Although the push rod 113 is fixedly connected to the service piston 59, it is apparent that a pivotal connection therebetween could be utilized which is a well known expediency in the art. The base wall 49 is provided with an integrally formed, radially extending flange 115 which is fixedly connected to the rightward end of the emergency piston sleeve 38 by suitable means, such as a plurality of screws 116, and the emergency spring 48 is biased between said flange 115 and closure member end wall 28.

It is now apparent that novel friction device operating mechanisms or actuating cylinders meeting the objects set out hereinbefore are provided and that changes or modifications to the precise configurations, shapes or details of the constructions set forth in the disclosure by way of illustration may be made by those skilled in the art without departing from the spirit of the invention as defined by the claims which follow.

What I claim is:

1. A friction device operating mechanism comprising a housing having a bore therein, an end wall connected with said housing and closing one end of said bore, a centrally located opening in said end wall, first piston means including a head portion and an integral sleeve portion slidable in said housing bore, a sleeve bore in said sleeve portion, aperture means in said head portion and aligned with said end wall opening, a base wall connected to said sleeve portion and axially spaced from said head portion, second piston means slidable in said sleeve bore, extension means on said second piston means slidable in said aperture means and opening and having a working end exteriorly of said housing, an expansible chamber in said sleeve bore between said second piston means and base wall, means for introducing fluid pressure into said expansible chamber, said second piston means being movable in response to fluid pressure in said chamber to actuate said extension means and energize the working end thereof, another expansible chamber in said housing bore between said end wall and first piston means, other means for introducing fluid pressure into said other chamber, and spring means urging said first piston means in a direction to oppose expansion of said other chamber, said spring means being extendable to engage and concertly move said first and second piston means to actuate said extension means and energize the working end thereof when the fluid pressure in said other chamber is less than a predetermined amount.

2. A friction device operating mechanism comprising a cylinder having an expansible chamber therein, first piston means slidable in said cylinder, a bore in said first piston means, second piston means slidable in said bore and normally engaged with said first piston means, extension means on said second piston means extending through said first piston means and chamber and having a working end exteriorly of said cylinder, another expansible chamber in said bore between said first and second piston means, means for introducing fluid pressure into said first named chamber, spring means engaged with said first piston means to oppose expansion of said first named chamber, said spring means being extendable to concertly urge said first and second piston means and extension means in a working direction to mechanically energize said working end when the fluid pressure in said first named chamber is less than a predetermined amount, means for introducing fluid pressure into said other chamber, said first and second piston means being relatively movable in response to fluid pressure in said other chamber to maintain the intensity of the energization of said working end within a predetermined amount.

3. A friction device operating mechanism comprising a housing having a side wall with a bore therein, a pair of opposed end walls connected with said side wall and closing the ends of said side wall bore, first and second openings in said end walls, respectively, first piston means including a head portion and an integral sleeve portion slidable in said side wall bore, a sleeve bore in said sleeve portion, an aperture in said head portion, a base wall connected to said sleeve portion and closing said sleeve bore, threaded extension means on said base wall extending through said first opening, second piston means slidable in said sleeve bore and normally engaged with said base wall, other extension means on said second piston means slidable in said head portion aperture and second opening, a working end on said other extension means exteriorly of said housing, first and second fluid pressure ports connected with said side wall bore and sleeve bore, respectively, said second piston means being movable in response to fluid pressure in said second fluid pressure port to actuate said other extension means and energize the working end thereof, spring means interposed between one of said end walls and said first piston means, said spring means being extendable to effect protractile movement of said first and second piston means to actuate said other extension means and energize the working end thereof when the fluid pressure at said first fluid pressure port is less than a predetermined amount, disabling means threadedly engaged with said threaded extension means, said disabling means being slidable in said second opening and adapted for bearing engagement with the other of said end walls, said disabling means being movable in response to an applied force thereon into bearing engagement with said other end wall and into further threaded engagement with said threaded extension to effect retractile movement of said first piston means toward an inoperative position against the compressive force of said spring means, said second piston means being retractively movable therewith to de-actuate said other extension means and de-energize the working end thereof.

4. A friction device operating mechanism comprising a housing having stepped bores therein, a pair of piston means, one of said piston means being slidable in the larger of said housing stepped bores and defining therewith an expansible fluid pressure chamber, other stepped bores in said one piston means, said other piston means being slidable in the larger of said other stepped bores and defining therewith another expansible fluid pressure chamber, said other piston means having extension means thereon slidable in the smaller of said other stepped bores and said smaller housing stepped bore including a working end exteriorly of said housing, said other piston means being movable in response to fluid pressure in said other chamber to actuate said extension means and energize said working end, and spring means engaged with said one piston means and extendable to engage and concertly move said piston means and extension means to energize said working end when the fluid pressure in said first named chamber is less than a predetermined amount.

5. A friction device operating mechanism comprising a housing, resiliently urged means movable in said housing and defining therewith an expansible fluid pressure chamber, other means adapted for relative and concert movement with said resiliently urged means and defining therein another expansible fluid pressure chamber, and extension means connected with said other means and extending through said resiliently urged means and first named chamber including a working end exteriorly of said housing, said other means being relatively movable in response to fluid pressure in said other chamber and being concertly movable with said resiliently urged means upon movement thereof in response to fluid pressure in said first named chamber less than a predetermined value to actuate said extension means and the working end thereof.

6. A friction device operating mechanism comprising a housing, resiliently urged means movable in said housing and defining therewith an expansible fluid pressure chamber, other means adapted for relative and concert movement with said resiliently urged means and defining therein another expansible fluid pressure chamber and an opposed atmospheric chamber, extension means on said other means extending through said atmospheric chamber, said first named chamber and said resiliently urged means including a working end exteriorly of said housing, and means in said resiliently urged means for venting said atmospheric chamber, said other means being relatively movable in response to fluid pressure in said other chamber and being concertly movable with said resiliently urged means upon movement thereof in response to fluid pressure in said first named chamber less than a predetermined value to actuate said extension means and the working end thereof.

7. A friction device operating mechanism comprising a housing having a pair of concentric piston means therein, one of said piston means defining in the other of said piston means an expansible fluid pressure chamber and an opposed atmospheric chamber, means in said other piston means for venting said atmospheric chamber, said other piston means being movable in said housing and defining therewith another expansible fluid pressure chamber, extension means on said one piston means extending through said atmospheric chamber, said other piston means and said other chamber including a working end exteriorly of said housing, said one piston means being movable relative to said other piston means in response to fluid pressure in said other chamber to actuate said extension means and the working end thereof, and spring means urging said other piston means against fluid pressure expansion of said other chamber, said spring means being extendable to engage said other piston means with said one piston means and effect concert movement therebetween to actuate said extension and the working end thereof when fluid pressure in said other chamber is less than a predetermined value.

8. A friction device operating mechanism comprising a housing, resiliently urged means movable in said housing and defining therewith an expansible fluid pressure chamber, other means adapted for relative and concert movement with said resiliently urged means and defining therewith another expansible chamber, a pair of bores in said resiliently urged means and housing, respectively, and extension means on said other means slidable in said bores and extending through said first named chamber including a working end exteriorly of said housing, said other means being movable relative to said resiliently urged means in response to fluid pressure in said other chamber and concertly movable with said resiliently urged means upon movement thereof in response to fluid pressure in said first named chamber less than a predetermined value to actuate said extension means and the working end thereof.

9. The friction device operating mechanism according to claim 8 wherein said resiliently urged means and the other means include opposed effective areas respectively responsive to fluid pressure in said other chamber wherein fluid pressure in said other chamber acting on the effective area of said resiliently urged means establishes a force in opposition to movement thereof when the fluid pressure in said first named chamber is less than the predetermined value to limit the intensity of the actuation of said extension means and working end.

10. The friction device operating mechanism according to claim 8 comprising abutment means for engagement between said resiliently urged means and other means to effect the concert movement thereof upon movement of said resiliently urged means when the fluid pressure in said first named chamber is less than the predetermined value.

11. The friction device operating mechanism according to claim 8 comprising disabling means drivingly engaged with said resiliently urged means and providing a mechanical connection between said resiliently urged means and housing upon movement of said resiliently urged means to actuate said extension means and the working end thereof, said disabling means being movable in response to an applied force thereon to drive said resiliently urged means in a direction to mechanically de-actuate said extension means and the working end thereof.

12. The friction device operating mechanism according to claim 8 wherein said resiliently urged means includes piston means slidable in said housing and defining therewith said first named chamber, said bore of said resiliently urged means being provided in said piston means, and spring means urging said piston means in opposition to fluid pressure expansion of said first named chamber, and said other means defining in said piston means said other chamber, said spring means being extendable to move said piston means when the fluid pressure in said first named chamber is less than the predetermined value.

13. The friction device operating mechanism according to claim 12 wherein said housing includes an aperture, an extension on said piston means, and disabling means slidable in said aperture and adapted for driving engagement with said piston means extension and bearing engagement with said housing means, said disabling means being movable in response to an applied force into bearing engagement with said housing and into driving engagement with said piston means extension to mechanically move said piston means against said spring means and de-actuate the working end of said other means when the fluid pressure in said first named chamber is less than the predetermined value.

14. The friction device operating mechanism according to claim 13 including a threaded peripheral surface on said piston means extension, a threaded bore in said disabling means threadedly engaged with said threaded peripheral surface, and an applied force transmitting flange on said disabling means for bearing engagement with said housing, said disabling means being initially movable in response to the applied force on said flange to move said flange into bearing engagement with said housing and thereafter movable into further threaded engagement with said threaded peripheral surface to effect the mechanical movement of said piston means against said spring means.

15. The friction device operating mechanism according to claim 12 wherein said housing includes a closure member, said spring means being biased between said piston means and closure member, and retaining means engaged between said housing and closure member to prevent displacement of said closure member from said housing in response to the force of said spring means.

16. The friction device operating mechanism according to claim 15 wherein said housing includes another bore in which said piston means is slidable, an annular flange on said closure member and slidable in said other housing bore, a plurality of aperture means in said housing and intersecting with said other housing bore including stud head receiving portions, a plurality of threaded apertures provided in said closure member flange for alignment with said aperture means, said retaining means including a stud inserted through each of said aperture means into threaded engagement with each of said threaded apertures and having a head portion adapted for abutting engagement with each of said head receiving portions, said spring means serving to urge said closure member in a direction to abuttingly engage said stud heads with said head receiving portions to obviate rotation of said studs and prevent threaded disengagement thereof from said threaded apertures.

17. The friction device operating mechanism according to claim 12 wherein said piston means includes a sleeve member having a bore therein, opposed end walls connected with said sleeve member and closing said sleeve member bore, said first named bore in said piston means being provided in one of said end walls substantially in alignment with said sleeve member bore, and said other means including other piston means connected with said extension means and slidable in said sleeve member bore to define therewith and the other of said end walls and said other chamber.

18. The friction device operating mechanism according to claim 17 comprising an atmospheric chamber defined in said sleeve member bore between said other piston means and one end wall and opposed to said other chamber, and means in said one piston means for venting said atmospheric chamber to the atmosphere.

19. The friction device operating mechanism according to claim 17 wherein said other end wall includes a wall member slidable in said sleeve member bore, and means engaged between said sleeve member and said wall member to retain said wall member against displacement from said sleeve member bore in response to fluid pressure in said other chamber.

20. A friction device operating mechanism comprising a housing resiliently urged means movable in said housing and defining therewith an expansible fluid pressure chamber, other means adapted for relative and concert movement with said resiliently urged means and defining therein another expansible fluid pressure chamber and an opposed atmospheric chamber, a pair of bores in resiliently urged means and housing, respectively, extension means engaged with said other means and having a working end exteriorly of said housing, said extension means being slidable in said bores and extending through said first named and atmospheric chambers, and means in said resiliently urged means for venting said atmospheric chamber to atmosphere, said other means being movable relative to said resiliently urged means in response to fluid pressure in said other chamber and being concertly movable with said resiliently urged means upon movement thereof in response to fluid pressure in said first named chamber less than a predetermined value to actuate said extension means and the working end thereof.

21. A friction device operating mechanism comprising a housing, a pair of concentric piston means adapted for concert and relative movement in said housing, one of said piston means defining within the other of said piston means opposed atmospheric and expansible fluid pressure chambers, said other piston means defining with said housing another expansible fluid pressure chamber, a pair of bores in said housing and other piston means, respectively, said one piston means including actuating means having a working end extending exteriorly of said housing, said actuating means being slidable in said bore and extending through said atmospheric and other chambers, means in said other piston means for venting said atmospheric chamber to atmosphere, said one piston means being relatively movable in response to fluid pressure in said first named expansible chamber to actuate said actuating means and the working end thereof, and spring means urging said other piston means in opposition to fluid pressure expansion of said other chamber, said spring means being extendable to engage said other piston means and said one piston means to effect concert movement thereof when fluid pressure in said other chamber is less than a predetermined value to actuate said actuating means and the working end thereof.

22. A friction device operating mechanism comprising a housing, a piston slidable in said housing between operative and inoperative positions and defining therewith an expansible fluid pressure chamber, a bore in said piston including opposed end walls, an opening in one of said end walls, another opening in said housing, another piston slidable in said piston bore and said first named and other openings and defining with said piston bore another expansible fluid pressure chamber, said other piston means extending through said first named chamber and including a working end exteriorly of said housing, said other piston being movable in response to fluid pressure in said other chamber to energize the working end thereof, spring means engaged between said first named piston means and housing, said first named piston means being movable against said spring means toward the inoperative position thereof in response to fluid pressure in said first named chamber in excess of a predetermined value, and means for engagement between said first named and other pistons to effect concert movement thereof and energize the working end of said other piston upon movement of said first named piston toward the operative position thereof by said spring means when the fluid pressure in said first named chamber is less than the predetermined value.

No references cited.

RICHARD B. WILKINSON, *Primary Examiner.*